United States Patent [19]

Rump et al.

[11] Patent Number: 5,549,369
[45] Date of Patent: Aug. 27, 1996

[54] METHOD FOR AUTOMATIC BRAKING OF MOTOR VEHICLES WITH AN ANTI-LOCK BRAKE SYSTEM

[75] Inventors: Siegfried Rump, Weinstadt; Manfred Steiner; Franz Brugger, both of Winnenden; Martin Klarer, Kernen; Bernd Knoff, Esslingen; Albrecht Eckl, Stuttgart, all of Germany

[73] Assignee: Mercedes-Benz AG, Germany

[21] Appl. No.: 337,427

[22] Filed: Nov. 8, 1994

[30] Foreign Application Priority Data

Nov. 8, 1993 [DE] Germany .......................... 43 38 065.4

[51] Int. Cl.⁶ ...................................................... B60T 8/58
[52] U.S. Cl. .......................................... 303/125; 303/188
[58] Field of Search ................................... 303/20, 113.2, 303/113.4, 113.5, 155, 186–189, 24.1, 125

[56] References Cited

U.S. PATENT DOCUMENTS

| | | | |
|---|---|---|---|
| 3,918,766 | 11/1975 | Klatt ........................................ | 303/189 |
| 4,606,586 | 8/1986 | Eckert et al. ........................... | 303/155 |
| 4,652,060 | 3/1987 | Miyake ................................. | 303/187 X |
| 4,768,840 | 9/1988 | Sullivan et al. ...................... | 303/155 X |
| 4,818,035 | 4/1989 | McNinch, Jr. ....................... | 303/155 X |
| 4,826,257 | 5/1989 | Burckhardt et al. .................. | 303/186 |
| 5,040,852 | 8/1991 | Takata ................................ | 303/113.4 X |
| 5,163,743 | 11/1992 | Leppek et al. ......................... | 303/155 |
| 5,171,071 | 12/1992 | Takata et al. ..................... | 303/113.4 X |
| 5,172,960 | 12/1992 | Chareire ................................ | 302/20 X |

FOREIGN PATENT DOCUMENTS

| | | |
|---|---|---|
| 0584813 | 3/1994 | European Pat. Off. . |
| 2367640 | 2/1974 | France . |
| 4028290 | 1/1992 | Germany . |
| 2192961 | 1/1988 | United Kingdom . |

*Primary Examiner*—Lee Young
*Attorney, Agent, or Firm*—Evenson, McKeown, Edwards & Lenahan P.L.L.C.

[57] ABSTRACT

The invention relates to a method for carrying out an automatic braking process for motor vehicles with an anti-lock brake system. An automatic braking process is triggered when it is detected by the anti-lock brake system that at least one wheel of an axle of the vehicle reaches the locking limit. The brake pressure for the axle of this wheel starts to be controlled by the anti-lock brake system. However, a further increase in brake pressure at the wheels of the other axles of the vehicle is possible since, because of the load distribution of the vehicle and because of the distribution of braking force, the locking limit of the said wheels is not yet reached. According to the invention, a further increase in the brake pressure at the other axles takes place during the automatic braking process.

11 Claims, 1 Drawing Sheet

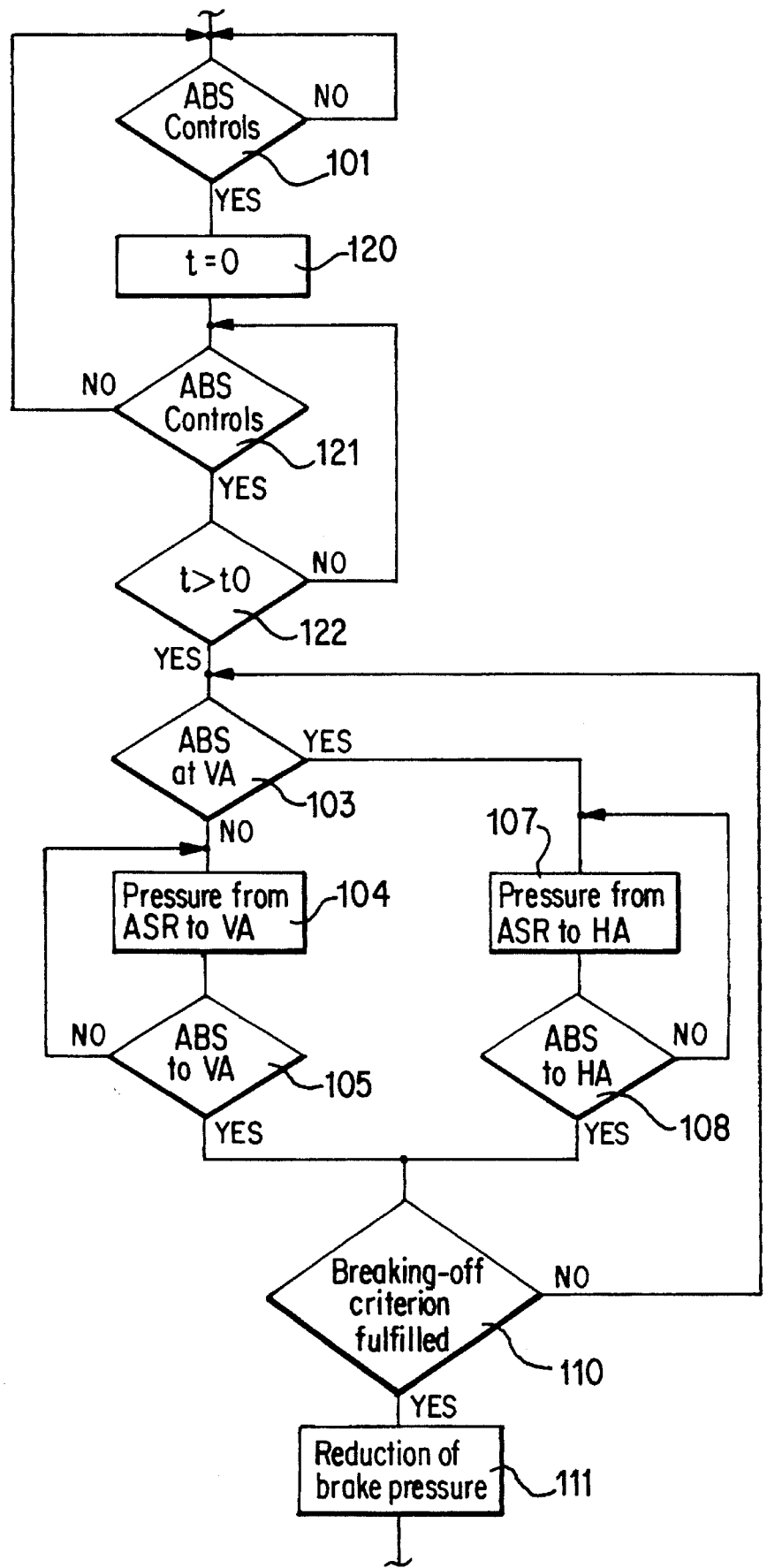

5,549,369

METHOD FOR AUTOMATIC BRAKING OF MOTOR VEHICLES WITH AN ANTI-LOCK BRAKE SYSTEM

This application is related to application Ser. No. 08/337, 426 filed on Nov. 8, 1994 in the name of Manfred Franz BRUGGER et al. for MONITORING METHOD AND DEVICE IN AUTOMATIC BRAKING PROCESS; to application Ser. No. 08/337,429 filed on Nov. 8, 1994 in the name of Siegfried RUMP et al. for METHOD FOR CONTROLLING THE TRIGGERING SENSITIVITY OF A VEHICLE AUTOMATIC BRAKING PROCESS TO MATCH DRIVER BEHAVIOR; to application Ser. No. 08/337,432 filed on Nov. 8, 1994 in the name of Manfred STEINER for METHOD OF CONTROLLING SENSITIVITY OF VEHICLE AUTOMATIC BRAKING PROCESS; to application Ser. No. 08/337,443 filed on Nov. 8, 1994 in the name of Manfred STEINER et al. for DEVICE FOR TERMINATING AN AUTOMATIC BRAKING PROCESS IN MOTOR VEHICLES; and to application Ser. No. 08/337,425 filed on Nov. 8, 1994 in the name of Manfred STEINER et al. for METHOD FOR TERMINATING A MOTOR VEHICLE AUTOMATIC BRAKING PROCESS.

BACKGROUND AND SUMMARY OF THE INVENTION

The invention relates to a method for automatic braking of motor vehicles with an anti-lock brake system, such as is disclosed, for example, in German patent document DE 40 28 290 C1.

In the latter publication, it is proposed to trigger automatic braking when the actuation speed of the brake pedal exceeds a threshold value. The automatic braking process is carried out until a termination criterion is fulfilled. One possible termination criterion, for example, is that the pedal retraction speed exceeds a threshold value. During automatic braking, a higher brake pressure is produced than that which corresponds to the position of the brake pedal.

The execution of automatic braking is associated with the fulfillment of the triggering criterion. The purpose of automatic braking is to shorten the braking (stopping) distance in critical driving situations. Braking operations in which the driver desires such a strong deceleration that the wheels are inclined to lock occur only in critical driving situations in which either there is only low adhesion between wheel and road, or the braking distance available is estimated by the driver as hardly sufficient.

In braking operations, when an anti-lock brake system commences control of the brake pressure of an axle, many drivers do not increase the brake pressure further, since they assume that the maximum possible brake pressure has already been produced. Thus, the maximum possible brake pressure is achieved only for the axle at which the brake pressure has started to be controlled by the anti-lock brake system, and a longer braking distance is required than would be for optimum braking by the driver.

The object of the present invention is to carry out an automatic braking process when a critical driving situation is detected by virtue of brake pressure being controlled by the anti-lock brake system. The degree of wheel slip at which the control of the brake pressure by the anti-lock brake system starts is referred to in this application as the locking limit.

This object is achieved by the automatic braking process according to the invention in which automatic braking is triggered when it is detected by the anti-lock brake system that at least one wheel of an axle of the vehicle has reached the locking limit. At this time, the anti-lock brake system commences control of the brake pressure for the wheels of this axle, so that an increase in brake pressure at the wheels affected by the ABS control is not possible. Because of the axle load distribution of the vehicle and because of the distribution of braking force at the wheels of the other axles, however, the locking limit of the latter wheels is not yet reached. According to the invention, therefore, the brake pressure applied to these wheels is further increased during the automatic braking process.

According to one embodiment of the invention, the brake pressure is increased until the locking limit of all wheels is reached, and thus the brake pressure for each axle is controlled by the anti-lock brake system.

A further embodiment of the invention proposes that the automatic braking process not be triggered until the ABS control of an axle has been operating for at least a time t0, which is between 0.1 s and 1 s, preferably for 400 ms.

Other objects, advantages and novel features of the present invention will become apparent from the following detailed description of the invention when considered in conjunction with the accompanying drawings.

BRIEF DESCRIPTION OF THE DRAWINGS

The single figure of the drawing is a flow diagram which shows steps performed in the method according to the invention for carrying out an automatic braking process.

DETAILED DESCRIPTION OF THE DRAWING

In the flow diagram, the sequence of an automatic braking process according to the invention is described for a two-axle vehicle in which reaching the locking limit of a wheel causes the brake pressure control for wheels of this axle to take place. (A corresponding control which does not start until both wheels of an axle are subject to control by the anti-lock brake system is achieved by appropriate matching of the interrogation criteria.) In step 101 it is determined whether a wheel has reached the locking limit; that is to say whether brake pressure is being controlled by the anti-lock brake system ABS. If not, the system returns to the beginning. If brake pressure control by the anti-lock brake system ABS is taking place, time t=0 is set in step 120, and a further inquiry is made at step 121 whether ABS is still taking place. If so, it is then determined whether time t is greater than a desired delay facto t0 (step 122), as noted previously. If not, step 121 and 122 are repeated until t>t0. The system then proceeds to step 103, in which a further determination is made whether the brake pressure at the front axle VA is being controlled. If so, in step 107 the brake pressure is increased at the rear axle HA by the traction control system TCS until it is detected in step 108 that the brake pressure is also being controlled at the rear axle HA.

If it is determined in step 103 that the brake pressure is not being controlled at the front axle VA, in step 104 the brake pressure at the front axle VA is increased by the traction control system TCS until it is detected in step 105 that the brake pressure is also being controlled at the front axle VA.

In step 110 it is tested whether the termination criterion of the automatic braking process is fulfilled (for example, whether the pedal retraction speed exceeds a predetermined threshold value, as noted previously). If not, the system returns to step 103. However, if the termination criterion is fulfilled, according to step 111 the brake pressure is decreased until it corresponds to the brake pressure produced by the pedal position of the brake pedal. The automatic braking process is then terminated.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method-for automatic braking of a motor vehicle having an anti-lock brake system which controls brake pressure for wheels of said vehicle which have reached a locking limit, said method comprising the steps of:

detecting when at least one wheel of the vehicle has reached said locking limit as a triggering criterion, and commencing brake pressure control for said at least one wheel by the anti-lock brake system in response thereto;

determining a brake pressure corresponding to the position of a brake pedal of said vehicle;

after detection of the occurrence of the triggering criterion, commencing performance of automatic braking, wherein brake pressure greater than that corresponding to the position of the brake pedal is generated; and detecting occurrence of a termination criterion;

terminating automatic braking upon detection of said termination criterion.

2. A method according to claim 1 wherein the locking limit being reached by all wheels of an axle is used as a triggering criterion.

3. A method according to claim 2 wherein the triggering of automatic braking does not take place until the locking limit is reached or it is detected that the brake pressure is being controlled by the anti-lock brake system over a prescribed time interval.

4. A method according to claim 1 wherein the triggering of automatic braking does not take place until it is detected that the brake pressure is being controlled by the anti-lock brake system over a prescribed time interval.

5. A method according to claim 4 wherein the prescribed time interval is between 0.1 s and 1 s.

6. A method according to claim 5 wherein the prescribed time interval is approximately 400 ms.

7. A method according to claim 5 wherein the brake pressure at axles which do not contain the at least one wheel which has reached a locking limit is increased by means of a brake pressure source of a traction control system.

8. A method according to claim 1 wherein the brake pressure is increased at wheels of axles other than those which contain the at least one wheel that reaches the locking limit.

9. A method according to claim 1 wherein a maximum brake pressure which can be produced is produced after occurrence of the triggering criterion has been detected.

10. A method according to claim 1 wherein the brake pressure is increased until, at each respective axle of the vehicle, it is detected by the anti-lock brake system that the locking limits for at least one wheel thereof has been reached.

11. A method according to claim 1 wherein the triggering of automatic braking does not take place until the locking limit is reached.

* * * * *